Figure 1:
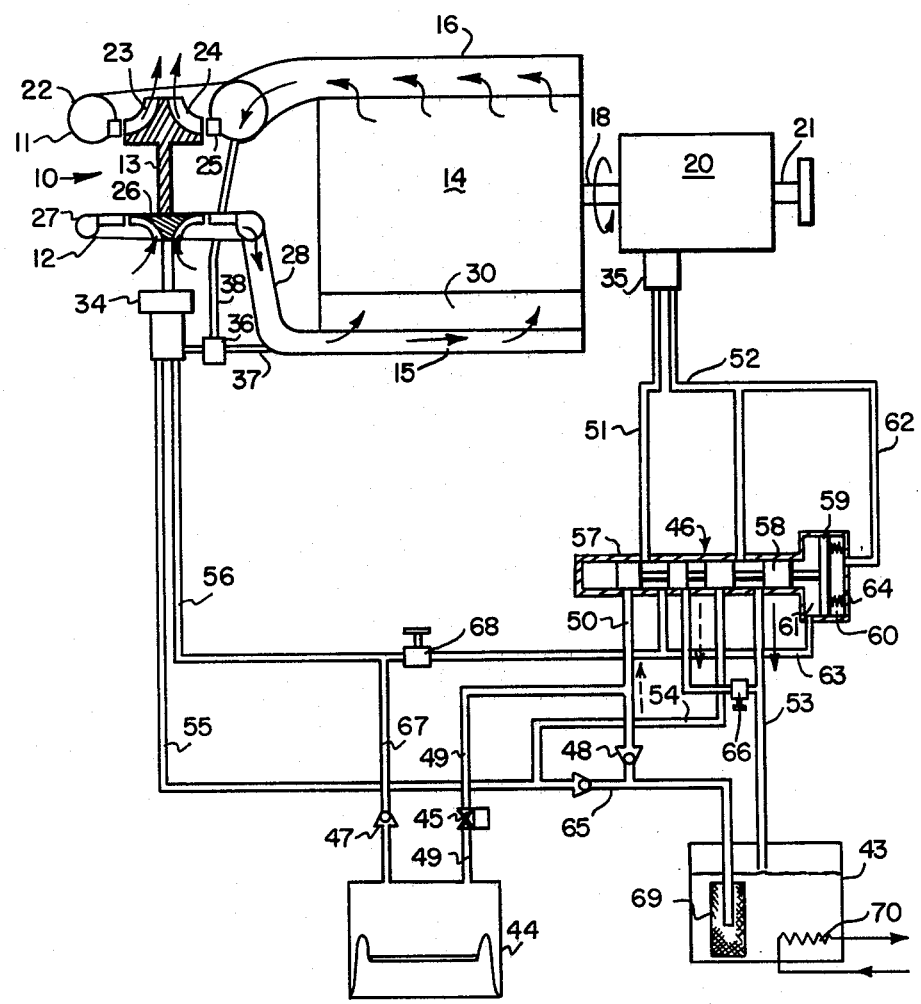

United States Patent [19]

Kumm

[11] 4,083,188
[45] Apr. 11, 1978

[54] ENGINE TURBOCHARGER SYSTEM

[75] Inventor: Emerson L. Kumm, Tempe, Ariz.

[73] Assignee: The Garrett Corporation, Los Angeles, Calif.

[21] Appl. No.: 767,276

[22] Filed: Feb. 10, 1977

[51] Int. Cl.² ............................................. F02B 33/44
[52] U.S. Cl. ......................................... 60/605; 60/608
[58] Field of Search ................ 60/600, 601, 606, 607, 60/608, 611, 605

[56] References Cited

U.S. PATENT DOCUMENTS

| 2,968,914 | 1/1961 | Birmann | 60/608 |
| 3,389,554 | 6/1968 | Wolf | 60/608 |
| 3,869,866 | 3/1975 | Timoney | 60/608 |
| 3,927,530 | 12/1975 | Braun | 60/607 |

Primary Examiner—Carlton R. Croyle
Assistant Examiner—L. J. Casaregola
Attorney, Agent, or Firm—Herschel C. Omohundro; James W. McFarland; Albert J. Miller

[57] ABSTRACT

The subject system is primarily for supercharging a low compression Diesel engine. It includes connected turbine and compressor elements and a hydraulic system having a first motor/pump unit mechanically connected with the turbine and compressor elements and a second motor/pump unit mechanically connected, through an output transmission, to the engine. The hydraulic system also includes a plurality of valves, an accumulator, a reservoir, and ducts connecting such elements and the motor/pump units. The first motor/pump unit is of the variable volume type and is controlled by an actuator responsive to fluid pressures in the inlet and exhaust manifolds of the engine. The second motor/pump unit is a fixed displacement device which may be driven by fluid pressure from the accumulator in the engine starting phase and by the engine to supply hydraulic pressure to recharge the accumulator and assist in controlling the operation of the supercharger. The operation of the supercharger is also controlled in part by a valve mechanism responsive to fluid pressures generated by the motor/pump units during predetermined phases of engine operation.

18 Claims, 4 Drawing Figures

ENGINE TURBOCHARGER SYSTEM

BACKGROUND OF THE INVENTION

This invention relates generally to engines and is more particularly directed to a supercharger system for a low compression engine to improve the efficiency thereof.

More specifically the invention relates to engine supercharging arrangements falling in the class exemplified by the following patents: U.S. Pat. No. 2,309,968 to Marburg, U.S. Pat. No. 2,968,914 to Birmann, U.S. Pat. No. 3,048,005 to Egli et al, U.S. Pat. No. 3,296,791 to Richard et al, and U.S. Pat. No. 3,603,079 to Kickbusch.

While the foregoing patents show engine supercharging arrangements none shows structure similar to that shown and described herein or structure capable of accomplishing the objectives secured with the combination of elements portrayed in this disclosure.

An object of this invention is to provide a supercharger system having a compressor driven by a turbine responsive to engine exhaust gases to supply an engine with inlet air under pressure and a hydraulic control system for regulating the operation of the turbosupercharger to maintain the pressure differential between the engine intake and exhaust which will result in the most efficient engine operation.

Also an object of the invention is to provide a supercharger system for a low compression engine, the system having a compressor driven by a turbine responsive to engine exhaust gases to supply the engine inlet with air under pressure and to couple the turbocompressor device with a fluid pressure energy translating unit which is hydraulically connected with a second fluid pressure energy translating unit mechanically connected with the engine output element, suitable control members being arranged in the hydraulic connection between the units to secure the optimum results.

A further object of the invention is to provide an engine turbocharger arrangement which will deliver two to two and a half times the power of more conventional turbocharged engines of similar size, use being made of a compressor of large flow range and design pressure ratio of three or more supplying compressed air to a Diesel engine having a design volumetric compression ratio (CR) of less than 9:1 as compared to the usual compression ratio (CR) of 14:1 or more, the arrangement including means for cooling the compressed air prior to the introduction thereof into the engine, and hydraulic control means having power receiving and transmitting connections with the supercharger and engine and being responsive to engine operating conditions to effect control functions.

A still further object of the invention is to provide an engine turbocharger system having a compressor mechanically connected with a turbine arranged to be driven by exhaust gases from the engine, the output from the compressor being delivered to the engine intake, the system having a hydraulic section including first and second motor/pump units mechanically connected with the turbocharger and engine, respectively, an accumulator, a reservoir, valves and actuating means therefore, and ducts extending between the motor/pump units and the latter elements, the first of the motor/pump units being of the variable displacement type and having a control actuator responsive to pressure differences between the engine inlet and outlet manifolds to adjust the volume of the first motor/pump unit and vary the output of the turbocharger.

Other objects and advantages of the invention will be made apparent by the following description of one form of the invention illustrated in the accompanying drawing.

IN THE DRAWING

Figure 2:
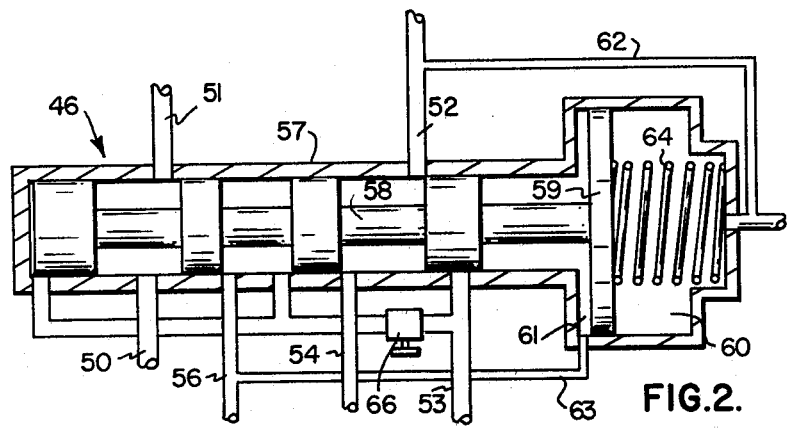
Figure 3:
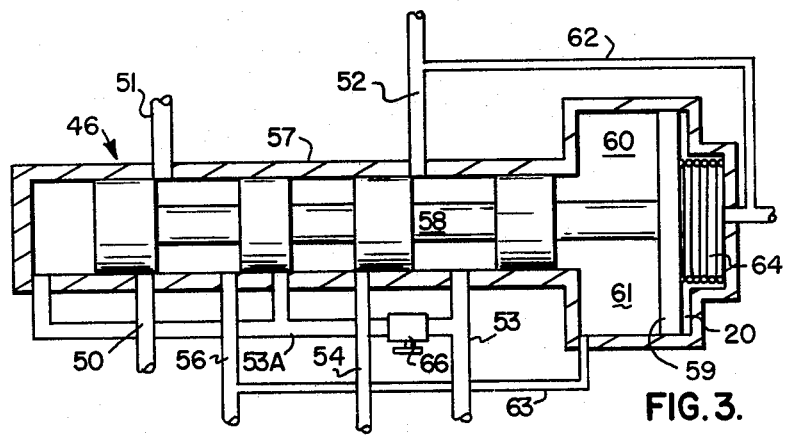
Figure 4:
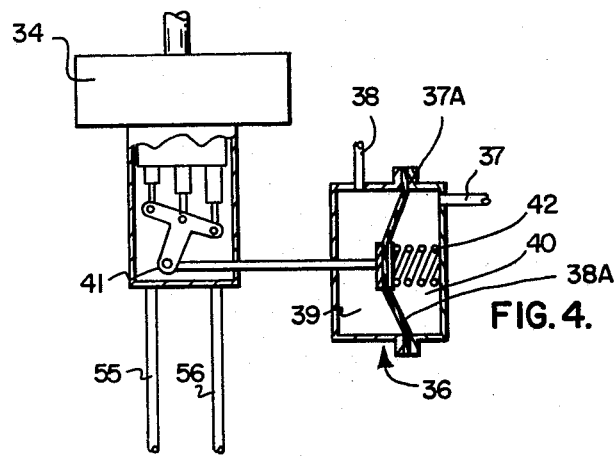

FIG. 1 is a schematic view of a turbocharger associated with an engine and having a control system embodying the invention connected therewith;

FIGS. 2, 3, and 4 are schematic sectional views illustrating a control valve and oher mechanism forming parts of the control system.

DESCRIPTION

More particular reference to the drawing will show that the turbosupercharger 10 has a turbine portion 11 and a compressor portion 12 with a common shaft 13. It is disposed adjacent an engine 14 which is to be served thereby, the engine having an intake manifold 15 and an exhaust manifold 16.

The engine 14, which may be of any suitable type but preferably a low compression Diesel, has a main shaft 18 extending to a suitable transmission 20 with an output shaft 21.

Turbine 11 is of the centripetal type and has a torus 22 disposed around the periphery of a rotor 23 having radially inwardly and axially extending passages 24. The torus is equipped with guide vanes 25 for directing engine exhaust gases from the torus, which is connected with exhaust manifold 16, into the passages 24 to effect rotation of the rotor 23. The vanes 25 may be adjustable or stationary according to the desires of the manufacturer.

Rotor 23 is fixed to one end of shaft 13, the opposite end of which carries the centrifugal impeller 26 forming part of the compressor 12. Impeller 26 has a plurality of blades forming passages extending axially into the impeller and radially outwardly thereof. A collector diffuser ring 27 surrounds the impeller to receive the air drawn into the impeller passages and discharged radially therefrom as the impeller is rotated by the turbine. The ring 27 is connected by duct 28 with the intake manifold 15 and the latter receives air from the former as the impeller is revolved. A suitable cooling element 30 is arranged between the manifold 15 and the engine to extract heat from the compressed air delivered to the manifold by compressor 12.

The invention herein includes a hydraulic control system having a pair of hydraulic units hereinafter referred to as fluid pressure energy translating devices or motor/pump units. One such unit, designated by the numeral 34, has a shaft connected with the shaft 13 or impeller 26 of the turbosupercharger to transmit to and receive rotary energy therefrom. Motor/pump unit 34 is of the variable displacement type for reasons to be set forth hereinafter. The second motor/pump unit 35 is of the fixed displacement type and is mechanically connected with the engine 14 through the transmission 20 to transmit to and receive rotary energy from the engine. Units 34 and 35 utilize hydraulic fluid and are known as positive displacement devices. The displacement of motor/pump unit 34 is controlled by an actuator 36 responsive to fluid pressure differences in the engine intake and exhaust manifolds 15 and 16, respectively, lines 37 and 38 serving to connect pressure chambers in the actuator 36 with the manifolds.

As shown in FIG. 4, actuator 36 includes a housing 37A divided by a diaphragm 38A into pressure chambers 39 and 40. The diaphragm 38A is connected by a rod with the volume varying arm 41 of unit 34. Spring means 42 in the housing 37 yieldably holds the lever 41 in the maximum volume position when the pressures in chambers 39 and 40 are equal, or in the absence of a pressure differential in the intake and exhaust manifolds.

The hydraulic control system also includes a reservoir 43, an accumulator 44, a series of valves 45, 46, 47, and 48, and a plurality of ducts 49 to 56, inclusive, which completes the system. When the system is being prepared for use, it will be filled with hydraulic fluid and the gas chamber of the accumulator 44 will be charged with gas under pressure as is usual with hydraulic systems.

As shown in FIGS. 1, 2, and 3, certain ducts, ie, 50, 51, 52, 53, 54, and 56, all communicate with spaced ports in valve 46. This valve is a combination fluid pressure and spring actuated flow control device. The valve 46 includes a casing 57 forming a bore with which the ducts 50 to 54 inc. and 56 communicate as mentioned. The bore receives a spool 58 with a plurality of annular grooves for connecting certain ducts depending upon the position of the spool. At one end, the casing has a piston chamber which is divided into a pair of sections 60 and 61 by a piston 59 connected with the spool 58. The chamber sections 60 and 61 are connected by lines 62 and 63, respectively, with ducts 52 and 56 for reasons to be set forth hereinafter. Chamber section 60 also contains a spring 64 which yieldably holds the spool in the position shown in FIG. 2, when chamber sections 60 and 61 contain substantially equal pressures. With spool 58 in the position shown in FIG. 2 ducts 50 and 51 are in communication through the valve 46. At this time, operation of the Diesel engine may be initiated by energizing the electro-responsive valve 45 which controls the flow of fluid under pressure from the accumulator to the hydraulic motor/pump 35 through lines 49, 50, and 51. Fluid discharged from unit 35 will flow through line 52 to valve 46 and then through lines 54 and 55 to hydraulic motor/pump 34 which is connected with the supercharger and from this unit through line 56 to valve 46. The spool 58 at this time (see FIG. 2) is in position to connect duct 56 with reservoir 43 through line 53. Since unit 35 is mechanically geared to the engine, operation of the motor/pump 35 with fluid under pressure from the accumulator will cause engine rotation and the ingestion of air.

Additional air will be supplied to the engine by the supercharger being driven by motor/pump 34 which receives fluid under pressure discharged from motor/pump 35 through lines 54 and 55 during the engine starting operation. The supercharger will also be driven by the exhaust gases from the Diesel engine although such gases will be at this time relatively cool. At the proper time fuel will be injected and self-sustained engine operation will start. Engine operation causes the output of heated exhaust gases through the exhaust manifold 16 to the gas turbine section 11 of the turbosupercharger unit 10 and the turbine will drive the compressor section 12 to supply air under pressure to the engine intake manifold 15. After self-sustained engine operation has started, valve 45 will be shifted to close the duct 49 leading from the accumulator 44. The Diesel engine will accelerate to idle speed and then be ready for power output. At this time the spool 58 of flow control valve 46 will be in the position shown in FIG. 2 in which lines 50 and 51 are in communication. After valve 45 is closed unit 35 will then draw hydraulic fluid from reservoir 43 through a branch duct 65 connected with line 50. This branch contains a check valve 48 which prevents flow from line 50 to the reservoir. While spool 58 is in the FIG. 2 position the discharge from unit 35 will be directed to unit 34 through lines 52, 54, and 55. Branch line 65 is also connected with line 55 leading to motor/pump unit 34, a second check valve 48 being disposed in this connection to permit unit to draw fluid from the reservoir but prevent reverse flow to the reservoir.

When self-sustained engine operation starts and idle speed is approached the exhaust gases become hotter and the pressure supplied to the turbine inlet increases. This increase in turbine inlet pressure is transmitted to the volume control of motor/pump 34 causing it to decrease the hydraulic fluid output and therefore the load applied to the turbine 11. The lighter load plus the increase in turbine inlet pressure permits a rapid increase in speed of the turbosupercharger with a consequent increase in air volume and pressure supplied to the engine intake manifold. This increase in manifold pressure is transmitted through line 37 to pressure chamber 40 where it is applied to diaphragm 38A to tend to shift the volume control back toward higher volume. The control will modulate and quickly reach equilibrium position in which a predetermined pressure differential between intake and exhaust manifolds is to be substantially maintained.

As the hydraulic unit 34 output is increased, its demand for fluid from unit 35 will also increase causing the pressure in line 52 leading from unit 35 to fall. This pressure decrease will be transmitted via bleed line 62 to chamber 60 in the actuating section of valve 46. The increase in output volume from unit 34 also increases the pressure in line 56 and such pressure will be transmitted via bleed line 63 to chamber section 61 in the actuator of valve 46. Since piston 59 will then be exposed on opposite sides to this differential in pressures, it will quickly move spool 58 in opposition to the force of spring 64 to the position shown in FIG. 3. This action will take place when the Diesel engine idle speed is exceeded by a predetermined increment to be selected by the manufacturer. The shift of spool 58 by fluid pressure in line 56 may be augmented by an adjustable orifice 66 disposed in branch line 53A to resist flow from line 56 to the reservoir through lines 53A and 53.

In the FIG. 3 position of spool 58, line 56 leading from unit 34 will be connected with line 51 leading to unit 35 and fluid under pressure from unit 34 will be supplied to unit 35. The discharge from unit 35 will now flow through line 52 to valve 46 and thence to the reservoir through line 53.

As shown in FIG. 1, line 56 leading from power unit 34 is connected by a line 67 with the accumulator 44, a check valve 47 being disposed in line 67 to prevent flow from accumulator 44 through such line. Line 67 is provided to permit fluid flow to the accumulator to recharge the same when the output from unit 34 reaches a predetermined pressure. If desired, a selectively actuated valve, indicated by numeral 68, could be incorporated in line 56 adjacent to the connection of line 67 therewith. Temporary closure of valve 68 during operation of the turbocharger would effect the recharging operation.

In the operation of the Diesel engine with the turbosupercharger of the present invention an operator demand for power gives an increased fuel flow which causes the exhaust gas temperature to increase initially, resulting in an increase in the pressure at the turbine inlet. As previously pointed out, the increase in turbine inlet pressure causes the displacement of the hydraulic power unit 34 to decrease, thus decreasing the hydraulic discharge flow and pressure and permitting additional turbine power to be used to accelerate the turbocharger to a higher speed. The turbocharger will then put out more air flow at a higher pressure, resulting in more Diesel engine power. Conversely, if the operator demands less power, reducing the engine fuel flow, this action results in a lower exhaust temperature at the turbine inlet and a decrease in pressure. The hydraulic power unit control then increases the displacement of the hydraulic power unit 34, causing the turbocharger speed to decrease. The lower turbocharger speed results in a decreased air flow and air pressure to the Diesel engine which gives lower engine output power. The changes in hydraulic power demand act to permit the turbocharger to change speed more rapidly than is possible with conventional turbochargers, resulting in significantly shorter engine response times to operator demand.

As has been pointed out above, the spool 58 will be shifted from the engine starting and low power position, shown in FIG. 2, to the higher engine power position shown in FIG. 3, when the exhaust gas turbine 11 drives the hydraulic power unit 34 fast enough, at a predetermined volume setting, to produce, in line 56, a pressure sufficient to overcome the output pressure of unit 35 and the force of spring 64. When spool 58 is in the position shown in FIG. 3, line 56 from unit 34 will be connected with line 31 leading to power unit 35. The output of unit 35 will then be directed through line 52 to valve 46 and from this valve through line 53 to reservoir 43. The point of operation of the Diesel engine at which valve 46 is shifted to the FIG. 3 position will depend upon the manufacturer's desires. It should be recognized, however, that at higher engine power operation, e.g. in excess of approximately twenty-five percent of maximum design power, the hydraulic system may transmit power from the turbosupercharger to to the engine transmission output shaft. The efficiency of the engine is thus improved.

It should be obvious from the foregoing that the pressure difference between the Diesel engine intake and exhaust manifolds is used to regulate the displacement of the hydraulic unit 34. In addition the Diesel engine discharge (turbine 11 inlet pressure) is held above the Diesel engine inlet pressure (compresor 12 outlet pressure) at a somewhat constant amount over much of the Diesel engine operating range by the hydraulic displacement control.

From the foregoing description it will be seen that an engine turbocharger arrangement has been provided which will deliver two to three times the power of conventional turbocharged engines. A compressor of large flow range with a design pressure ratio of three and a half or more may be used to supply compressed air to a Diesel engine with a design volumetric compression ratio of less than nine as compared to the usual compression ratio of fourteen or more. The hot compressed air from the compressor is cooled by ambient air either directly or indirectly in an intercooler before entering the Diesel engine. The hydraulic control system for the turbocharger is operative to maintain substantially constant an optimum pressure difference between the engine intake and exhaust ports. In addition such system includes an accumulator for use in engine starting thus eliminating a major battery requirement and leading to a light weight, less expensive assembly.

With the differential control to regulate the displacement of the motor/pump geared to the turbocharger the conventional Diesel engine control may be used without modification to vary the engine governed speed by changing the fuel flow in the desired fashion. Thus, if the operator desires more power, the increased fuel flow to the engine causes the exhaust gas temperature to increase and decrease the differential pressure which causes less hydraulic flow and pressure from the turbocharger driven unit. More power is then available to the turbocharger causing it to accelerate very rapidly to a higher speed giving a higher pressure and greater airflow to the engine. The compressor output and turbocharger speed is controlled accurately to the engine requirements by the differential control 36 in both acceleration and deceleration to operator demands with little overshoot as is desired. The hydraulic elements permit much more rapid acceleration of the turbocharger and engine than is possible with conventional units.

I claim:

1. A turbocharger system for a low-compression engine and output transmission operatively connected therewith, the engine having an air intake manifold and an exhaust gas manifold, said turbocharger system comprising:
    (a) a turbocharger with a gas turbine arranged to receive gas from the exhaust manifold of the engine and a compressor connected for operation by said gas turbine, said compressor being arranged to discharge air into the intake manifold of the engine;
    (b) means for controlling the operation of said turbocharger having a pair of hydraulic power units, one being mechanically connected with said turbocharger and the other being mechanically connected with said engine through said output transmission;
    (c) a hydraulic system connected with said power units; and
    (d) means for varying the loading of the gas turbine via said hydraulic power units in accordance with predetermined phases of engine operation to maintain a substantially constant pressure differential between said inlet and exhaust manifolds.

2. The turbocharger system of claim 1 in which the hydraulic power unit connected with said turbocharger is of the variable volume type having a volume control.

3. The turbocharger system of claim 2 in which the variable volume hydraulic power unit is provided with a volume control actuator responsive to pressure differences in the inlet and exhaust manifolds of the engine.

4. The turbocharger system of claim 3 in which the actuator of the volume control tends to place the unit in maximum volume condition when the inlet and exhaust manifold pressures are substantially equal.

5. The turbocharger system of claim 2 in which the hydraulic system includes valve means responsive to certain conditions of operation of said power units to effect predetermined flow directions in said system.

6. The turbocharger system of claim 5 in which said valve means includes a part responsive to changes in output of said power units to effect predetermined flow directions in said system.

7. The turbocharger system of claim 2 in which the hydraulic system includes means for applying hydraulic fluid under pressure from a source thereof to said power units to initiate engine operation.

8. The turbocharger system of claim 7 in which the means for applying hydraulic fluid under pressure to said power units includes an accumulator and valve means.

9. The turbocharger system of claim 8 in which said valve means is responsive in part to fluid pressure to effect predetermined flow directions in said system.

10. The turbocharger system of claim 8 in which means are provided to recharge said accumulator after engine operation has been initiated.

11. The turbocharger system of claim 8 in which said valve means has a movable part operative in one position to connect said accumulator with the inlet of one of said power units and the outlet of such power unit with the inlet of the other power unit and the outlet of the latter to a point of low pressure.

12. The turbocharger system of claim 11 in which said movable part of said valve means is operative in another position to connect the outlet of the last-mentioned power unit with the inlet of the first-mentioned power unit and the outlet of the first-mentioned power unit to a point of low pressure.

13. The turbocharger system of claim 2 in which the hydraulic system includes, a reservoir, an accumulator, and valve means operative to direct fluid under pressure from said accumulator to the power unit connected with said engine to initiate operation thereof, said valve means then directing the discharge from such power unit to the power unit connected with said turbocharger and the discharge from the latter power unit to said reservoir, said value means then being operative to interrupt flow from said accumulator to the power unit connected with the engine and having a part responsive to fluid pressure to cause said valve means to shift and then direct the discharge from the power unit connected with said turbocharger to the power unit connected with said engine and the discharge from the latter power unit to said reservoir.

14. A turbocharger system for a low-compression engine and output transmission operatively connected therewith, the engine having an air intake manifold and an exhaust gas manifold, said turbocharger system comprising:
(a) a first means driven by gases from the exhaust gas manifold to supply air under pressure to said intake mainfold;
(b) a second means controlling the operation of said first means;
(c) a third means forming a part of said second means, said third means being responsive to pressure differences in said intake and exhaust manifolds to vary the operating conditions of said first means;
(d) a fourth means forming a part of said second means, said fourth means including a hydraulic system with fluid pressure energy translating devices connected with said engine and said first means, a source of fluid pressure, a reservoir, and valve means operaive to connect said fluid pressure energy translating devices with said source of fluid pressure to initiate engine operation and to connect said fluid pressure energy translating devices with one another to cause one to impart driving energy to the other.

15. The turbocharger system of claim 14 in which said third means includes an actuator with chambers communicating with said intake and exhaust manifolds and a movable wall separating said chambers.

16. The turbocharger system of claim 15 in which the fluid pressure energy tranlating device connected with said first means is of the variable volume type with the volume varying element connected with the movable wall of said actuator.

17. The turbocharger system of claim 16 in which said valve means has a movable part responsive to conditions of operation of said fluid pressure energy translating devices to shift from a position in which one predetermined fluid pressure energy translating device receives fluid energy from the other to a second position in which the predetermined fluid pressure energy translating device transmits fluid energy to the other.

18. The turbocharger system of claim 17 in which said valve means has a selectively actuated part to connect said source of fluid pressure with a predetermined fluid pressure energy translating device to initiate engine operation.

* * * * *